May 9, 1933.  F. ARLEDTER  1,908,102
ART OF CLARIFYING LIQUIDS CONTAMINATED BY SOLID MATTER
HELD IN SUSPENSION THEREIN AND IN CLARIFYING APPARATUS
Filed Oct. 23, 1928  2 Sheets-Sheet 2
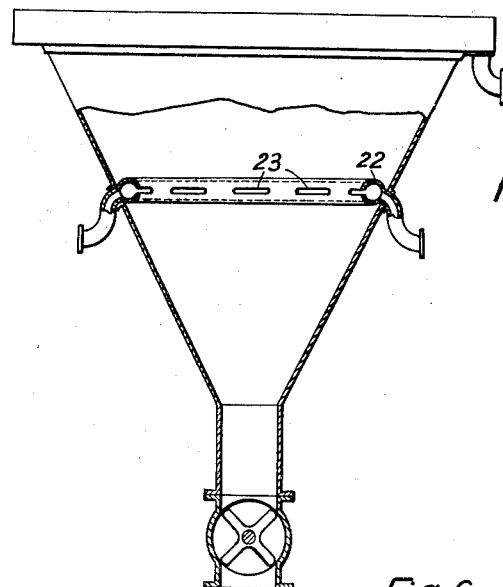
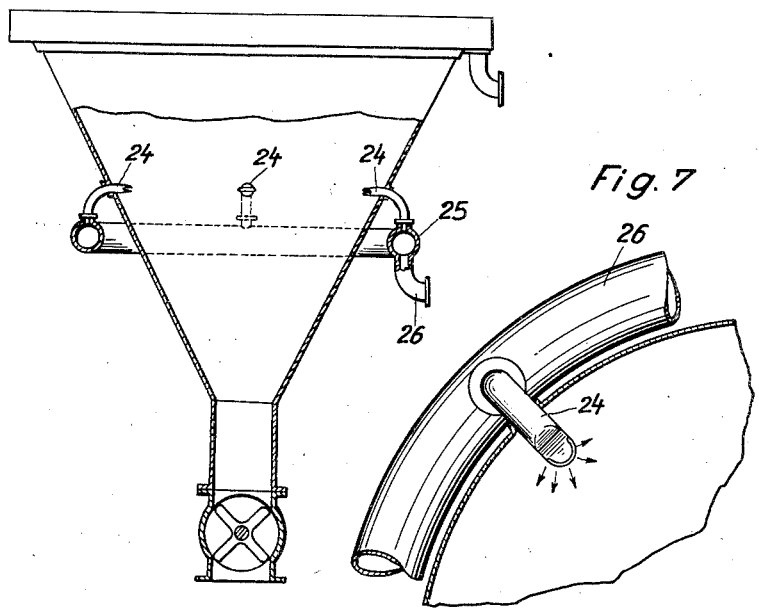
Inventor
Fritz Arledter
BY  A. W. Deller
Attorney Patented May 9, 1933

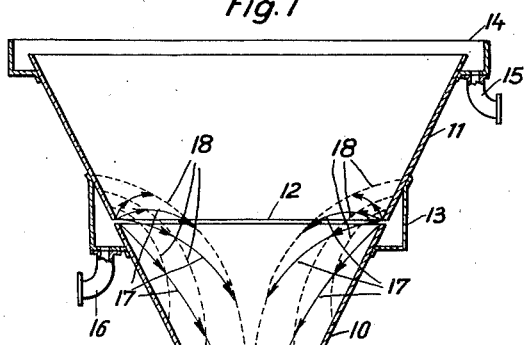
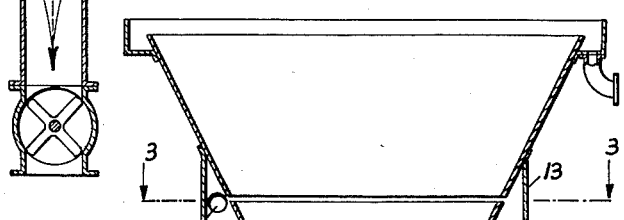
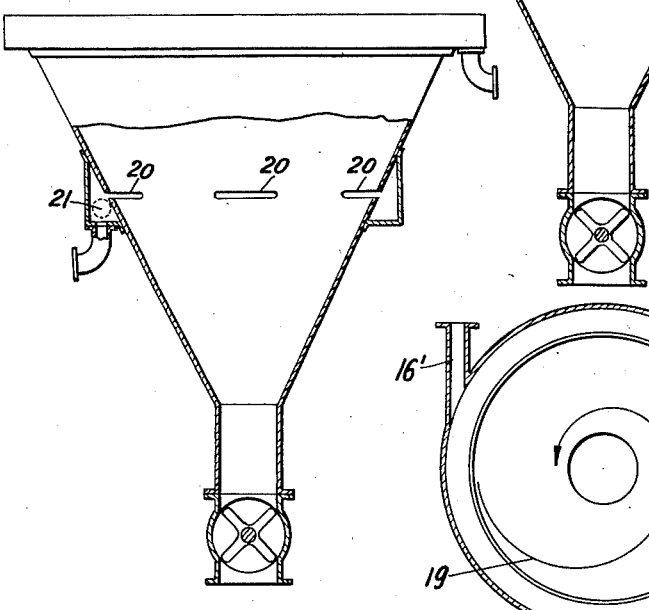
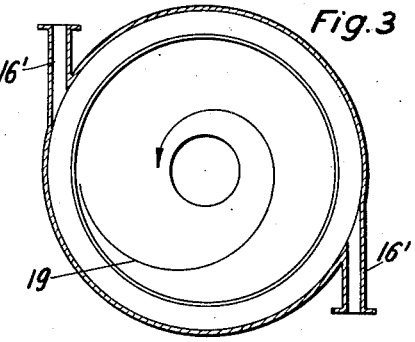

1,908,102

UNITED STATES PATENT OFFICE

FRITZ ARLEDTER, OF COLOGNE-KALK, GERMANY, ASSIGNOR TO GUSTAV STAELIN, OF LARCHMONT, NEW YORK

ART OF CLARIFYING LIQUIDS CONTAMINATED BY SOLID MATTER HELD IN SUSPENSION THEREIN AND IN CLARIFYING APPARATUS

Application filed October 23, 1928, Serial No. 314,523, and in Germany October 27, 1927.

My invention relates to the clarification of liquids contaminated by solid matter held in suspension therein and more particularly to a process and to an apparatus for clarifying such liquids.

My invention is based on the idea, that in a body of the contaminated fluid the solid matter will readily settle under the action of gravity, if the fluid is throughout its area at rest and free from currents, having an upwardly directed component which would interfere with the downwardly directed movement of the settling solid particles, such as paper fibres and sizing and filling stuffs.

In the clarification apparatus which have been used prior to my invention, the fluid to be clarified is supplied to a tank of considerable size provided in its interior with baffle-plates, partition walls and other parts projecting into its interior, such as pipe conduits etc, which are supposed to conduct the fluid in such a manner, that the solid matter suspended therein will be separated and will settle toward the bottom, wherefrom it may be removed while the clarified fluid is led from the top of the tank. The baffle-plates and other projecting parts, however, cause eddies, involving the generation of upwardly directed current components, which carry solid particles upwardly towards the outlet of the tank so that the clarification is insufficient, unless the admission of water to the tank is reduced to an extremely low rate rendering the clarification plant inefficient and uneconomic.

The object of my invention is to improve the clarification methods and apparatus with a view to increasing the output of a tank of a given size without simultaneously unfavorably affecting the purity of the clarified water.

Another object of my invention is to simplify the structure of clarification tanks.

All other objects of my invention will appear from the description following hereinafter and the features of novelty will be pointed out in the claims.

My invention involves the use of a compact body of the said fluid in which current conditions are maintained which are kept as uniform as possible over the entire area of the body so that in no point thereof upwardly directed current components will arise which are strong enough to keep the solid matter from settling towards the bottom. On the other hand such a movement is imparted to the liquid which will carry the same as fast as possible from the inlet to the outlet situated at a higher level. To this end I continually admit a stream of the contaminated liquid into the compact body of said liquid in the direction from a circumferential line surrounding said body below its level towards the interior thereof and simultaneously conducting a corresponding flow from said body at a level higher than said circumferential line. The stream is admitted at such a rate, that the resulting flow from the inlet towards the outlet has in no point an upwardly directed component which is strong enough to keep the solid matter from settling towards the bottom.

In the accompanying drawings various embodiments of clarifying tanks are shown by means of which my novel method may be practiced. Fig. 1 is an axial section through a cone-shaped clarifying tank; Fig. 2 illustrates a modified construction in a similar section; Fig. 3 is the section along the line 3 to 3 of Fig. 2; Figs. 4, 5 and 6 are axial sections through different embodiments and Fig. 7 is a detail of the embodiment shown in Fig. 6.

The clarifying tank shown in Fig. 1 has the shape of an inverted cone and is composed of a lower section 10 and an upper section 11 which are slightly spaced from each other to form a slot 12. Both sections are held in position relative to each other by a surrounding annular sheet-metal element 13 forming a conduit on the wall of the tank which surrounds the interior of the same and communicates therewith through the inwardly facing orifice formed by slot 12. A second annular sheet-metal element 14 is co-ordinated to the upper edge of section 11 to collect overflowing liquid which is led off through a suitable pipe 15. The lower mouth of section 10 is connected to a suitable lock through which the settling solid matter may be removed without offering a passage to the liquid. Such lock-devices are well-known in the art and for this reason need not be described in detail. As an example I have shown a closure comprising a rotatable, crossshaped element, in whose upper interstice the settled matter collects and may be removed through the outlet by rotation of said closure through 180 degrees.

The fluid to be clarified is admitted to conduit 13 through a suitable pipe connection 16 after the tank has been completely filled in any suitable manner. Consequently, a flow corresponding to the admitted quantity of liquid continually overflows the upper edge of section 11 and is removed through pipe 15. As the liquid entering the conduit 13 is admitted towards the interior of the compact body contained in the tank from a line circumferentially surrounding the body below its level, uniform current conditions are obtained within the section 11 in which the water flows upwardly from the slot 12 towards the overflow edge. Owing to these conditions the solid particles may readily settle towards the bottom without being upwardly carried to a considerable extent by eddy-currents. In Fig. 1 I have diagrammatically illustrated the path along which the solid particles issuing from slot 12 sink towards the bottom. The lines 17 indicate these paths and each of the broken lines 18 connects the points occupied by particles which have entered the body of liquid at the same time.

As the water admitted through slot 12 is spread in all directions to eventually reach over various paths the overflow edge its current velocity decreases as it leaves its point of entrance. The particles suspended in the water first participate in its movement so that some particles leave the slot in horizontal direction, other particles along a more upwardly directed path and still other particles more downwardly. At the same time, however, the particles perform a downward movement relatively to their surrounding water owing to the action of gravity so that the distance traversed by various particles entering at the same time is the smaller the more upwardly directed their path is, as readily appears from the diagrammatical illustration in Fig. 1. The uniform distribution of the lines 17 indicates that owing to the homogeneous current conditions the particles may settle over the entire area of the body of water. It is necessary of course that the water is admitted at such a low rate that in any point the upwardly directed component of the water current from slot 12 to the overflow edge is so small that the settling particles are not kept from settling. From the foregoing it will appear that my invention avoids a disturbance of the body of water contained in the tank thereby permitting the particles to sink towards the bottom along the shortest path whereby a relatively small tank may be used to clarify large quantities of contaminated liquid in an extremely short time. Furthermore, my novel method may be carried out by means of extremely simple tanks free from baffle-plates or the like which offer the important advantage, that they may easily be cleaned and are to be manufactured at a low price.

While in Fig. 1 one admission pipe 16 only is visible it is to be understood of course that preferably a plurality of said admission pipes 16 may be arranged in circumferential distribution.

Consequently, only a weak current of liquid is flowing in the longitudinal direction of pipe 13 so that the liquid entering through slot 12 is radially directed towards the vertical axis of the tank. As a consequence, the upwardly directed component of the resulting current is not quite uniform over the entire cross-section of the tank but increases towards the axis. As however, the liquid admission to the tank must be controlled so as to prevent an excessive upwardly directed current component from arising in any point, the permissible rate of admission depends in this case upon the current produced in the vertical axis of the tank, in other words, the admission could be increased, if the upwardly directed current in the axis of the tank could be kept below the settling speed of the particles. I have found various ways of performing this object. Preferably the liquid is caused to enter the body of liquid along spiral-shaped stream lines issuing from points distributed over a substantially horizontal circumferential line. In this case the particles of the liquid do not move in a radial path to the container axis, but approach the latter along a spiral helical line. As a consequence of this movement, the resulting centrifugal force generates a force counteracting the upwardly directed current component thereby reducing the latter by a degree which increases from the walls towards the axis. In this manner the upwardly directed current component may be rendered nearly uniform over the entire cross-section of the tank so that the rate of admission may be increased in comparison with the afore-described method involving radial flow as distinguished from spiral flow. In Fig. 2 I have shown an arrangement by means of which the said spiral flow may be produced. The tank shown in Fig. 2 equals the afore-described tank shown in Fig. 1 except for the arrangement of the admission pipes. In this embodiment the pipes 16 are open into the conduit 13 in tangential direction thereby producing a strong peripheral current therein, provided of course that the cross-section of conduit 13 is accordingly dimensioned. Owing to this peripheral current, the particles enter the body of liquid contained in the tank along spiral-shaped stream lines, such as line 19 shown in Fig. 3, as they tend to retain their circumferential movement but, at the same time, are inwardly urged by the following particles towards the axis. The resulting centrifugal force counteracts the effect of the inwardly directed current component tending to press the water outwardly. As a result the upwardly directed current component is reduced to such an extent as to be rendered substantially equal over the entire cross-section. It follows, that the solid particles contained in the water will settle with equal speeds throughout the area so that in no point they are carried into higher levels by excessive upwardly directed currents such as may easily arise in case of a radially directed admission.

Another way of preventing an excessive upwardly flowing current in the center consists in injecting a plurality of jets of said contaminated liquid from a plurality of circumferentially disposed points toward the interior of that body. In this case the individual jets are at liberty to spread in lateral direction and are thereby prevented from crowding towards the center, so that in the latter no excessive upward flow arises. In Fig. 4 I have shown an apparatus by means of which this method may be carried out. This apparatus is similar to the one shown in Fig. 1, except for the slot 12 which is substituted by a plurality of individual slots 20 spaced from each other. It is obvious that in this case the jets entering the interior of the tank will spread in lateral direction instead of rushing toward the centerline.

Also in the embodiment shown in Fig. 4 tangentially directed admission pipes similar to those shown in Figs. 2 and 3 may be provided, as indicated by the broken line 21. In this arrangement the individual jets issuing the orifices 20 do not aim towards the centerline but are spirally shaped, as will easily be understood.

In Fig. 5 I have shown an embodiment which differs from that shown in Fig. 4 in that the conduit surrounding the interior of the tank is formed by a pipe 22 interiorly mounted on the wall of the tank and provided with inwardly directed orifices 23 in spaced relation.

In the embodiment shown in Figs. 6 and 7 the individual orifices are formed by flat-mouthed nozzles 24 arranged along a circumferential line of the tank and issuing a flat jet indicated by the arrows in Fig. 7. The nozzles are fed by an annular conduit 25 surrounding the tank and provided with a suitable admission pipe 26.

While in the embodiments shown the tank has the shape of an inverted cone, it is to be understood that my invention is not limited to this kind of tanks although their use is preferable. Furthermore, the water may be led off from the tank in any suitable manner and, while the overflow collector 14 is advantageous, any other suitable way may be adopted.

It is characteristic of my method employing a spiral-shaped current or individual spaced jets that the water to be clarified is leaving the area in which upwardly directed current components are prevailing at such a low speed, that all solid matter suspended in the water has ample time to settle downwardly from the plane of admission and, consequently, from the influence of the rising liquids. This prevents a continuous hovering layer of solid matter from being formed above the plane of admission.

What I claim is:

1. An apparatus for the clarification of liquids contaminated with solid matter held in suspension which comprises an inverted cone-shaped tank having an unobstructed interior and having practically a circular cross-section, a slotted inlet orifice located at a region substantially midway between the top and the bottom of said tank and extending about substantially the entire periphery thereof, said slotted inlet orifice being arranged in practically a horizontal plane and adapted to introduce liquid to be clarified inwardly, spirally and horizontally towards the center of the tank, a conduit communicating with said slotted inlet orifice for feeding liquid to be clarified, an overflow trough associated with the uppermost and outermost periphery of said tank for withdrawing clarified liquid, said overflow trough being located in a region sufficiently remote from the inlet that the clarified liquid adjacent to said withdrawal means is free from eddy currents, mechanical agitation and also disturbances set up by incoming liquid to be treated, and an outlet at the bottom of said tank for removing solids separated from the clarified liquid, said outlet for solid matter being located in a region which is relatively free from eddy currents and mechanical agitation and which is relatively quiescent.

2. An apparatus for the clarification of liquids contaminated with solid matter held in suspension which comprises an inverted cone-shaped tank having an unobstructed interior and having practically a circular cross-section, an inlet orifice located at a region substantially midway between the top and the bottom of said tank and extending about substantially the entire periphery thereof, said inlet orifice being arranged in practically a horizontal plane and adapted to introduce liquid to be clarified inwardly, spirally and horizontally towards the center of the tank, a conduit communicating with said inlet orifice for feeding liquid to be clarified, an overflow trough associated with the uppermost and outermost periphery of said tank for withdrawing clarified liquid, said overflow trough being located in a region sufficiently remote from the inlet that the clarified liquid adjacent to said withdrawal means is free from eddy currents mechanical agitation and also disturbances set up by incoming liquid to be treated and an outlet at the bottom of said tank for removing solids separated from the clarified liquid, said outlet port for solid matter being located in a region which is relatively free from eddy currents and mechanical agitation and which is relatively quiescent, and a valve associated with said bottom outlet for controlling the withdrawal of the solid matter.

3. An apparatus for the clarification of liquids contaminated with a solid matter held in suspension which comprises a tank having sides sloping from the top to the bottom and having a substantially unobstructed interior, a conduit for introducing liquid to be clarified peripherally located with respect to said sloping sides at a region substantially midway between the top and the bottom of said tank, an orifice associated with said conduit and arranged to introduce the liquid inwardly into the interior and towards the center of said tank in practically a horizontal plane, an outlet located in the bottom of said tank for removing solids separated from the liquid, said outlet port for solid matter being located in a region which is relatively free from eddy currents and mechanical agitation and which is relatively quiescent, and an overflow trough located at the top of said tank and associated with the outermost periphery thereof for the removal of clarified liquid, said overflow trough being located in a region sufficiently remote from the inlet that the clarified liquid adjacent to said overflow trough is free from eddy currents, mechanical agitation and also disturbances set up by incoming liquid to be treated.

4. An apparatus for the clarification of liquids contaminated with solid matter held in suspension which comprises an inverted cone-shaped tank having an unobstructed interior and having the sides practically converging at the bottom thereof, inlet means associated with the sides of said tank and located at a region substantially midway between the bottom of said tank and the top thereof, said inlet means being arranged to introduce the liquid to be clarified substantially horizontally, spirally and inwardly toward the center of the tank, a conduit communicating with said inlet orifice for feeding liquid to be clarified, an outlet at the bottom of said tank for withdrawing solid matter removed from the liquid, said outlet for solid matter being located in a region which is relatively free from eddy currents and mechanical agitation and which is relatively quiescent, and an overflow trough associated with practically the entire uppermost and outermost periphery of said tank for removing clarified liquid, said overflow trough being located in a region sufficiently remote from the inlet that the clarified liquid adjacent to said withdrawal means is free from eddy currents, mechanical agitation and also disturbances set up by incoming liquid to be treated.

5. A process for the clarification of liquids contaminated by solid matter held in suspension which comprises establishing a compact conical body of relatively quiescent liquid free from mechanical agitation, introducing a stream of contaminated liquid into said relatively quiescent body of liquid in a substantially horizontal direction from a circumferential line located at a region substantially midway between the bottom and the top of said body of liquid and inwardly toward the center of said body, imparting a spiral motion to said inwardly and horizontally introduced liquid, permitting solids to separate freely and undisturbed from said liquid without interference from mechanical agitation, baffle plates and the like, and removing the clarified liquid from the uppermost and outermost periphery of said body of liquid.

6. A process for the clarification of liquids contaminated by solid matter held in suspension which comprises establishing a compact body tapering from the top to the bottom of relatively quiescent liquid free from eddy currents, mechanical agitation and the like, introducing at a region substantially midway between the top and the bottom of said body a stream of contaminated liquid from circumferentially distributed points in and about practically the entire periphery of said body of liquid, imparting to said stream a substantially horizontal and spiral motion directed inwardly toward the center of said body, controlling the rate of flow of said introduced stream of liquid to such a rate that the upward component of the resultant flow in said body of liquid does in no way exceed the speed at which said solid matter is settling towards the bottom, permitting the solid matter to settle from said introduced liquid to a region at the bottom of the said body of liquid which is relatively free from eddy currents and mechanical agitation and which is in a relatively quiescent state, withdrawing said solid matter from the bottom of said body, and removing the clarified liquid from the uppermost and outermost periphery of said body of liquid at a region which is relatively free from eddy currents, mechanical agitation and also disturbances due to introduced contaminated liquid and which is in a relatively quiescent state.

In testimony whereof I have affixed my signature.

FRITZ ARLEDTER.